United States Patent [19]

Reiter

[11] Patent Number: 5,697,499

[45] Date of Patent: Dec. 16, 1997

[54] PACKAGE FOR DISC

[75] Inventor: Gottfried Reiter, Sternhofweg, Austria

[73] Assignee: Sony DADC Austria AG, Anif, Austria

[21] Appl. No.: 816,827

[22] Filed: Mar. 18, 1997

Related U.S. Application Data

[63] Continuation of Ser. No. 408,579, Mar. 22, 1995.

[30] Foreign Application Priority Data

Mar. 28, 1994 [AT] Austria ..................................... 658/94

[51] Int. Cl.$^6$ ............................................... B65D 85/30
[52] U.S. Cl. ...................................... 206/308.1; 206/312
[58] Field of Search .............................. 206/307, 308.1, 206/308.2, 309, 312

[56] References Cited

U.S. PATENT DOCUMENTS 4,635,792 1/1987 Yamada et al. .

FOREIGN PATENT DOCUMENTS 0 159 860 10/1985 European Pat. Off. .
0 335 826 7/1992 European Pat. Off. .
32 15 378 3/1983 Germany .
91 03 114.1 7/1991 Germany .

Primary Examiner—Paul T. Sewell
Assistant Examiner—Nhan T. Lam
Attorney, Agent, or Firm—William S. Frommer; Alvin Sinderbrand

[57] ABSTRACT

A package for a disc-like information medium, e.g. a compact disc, which package is made substantially from paper or cardboard and is provided with a body and a cover for it, with the body being provided with limiting parts which rest thereon and limit a receiving space corresponding to the circumferential line of the information medium to be received or of a case which may optionally be provided, into which the disc-like information medium is insertable and the cover covers the upper sides of the limiting parts in the closed condition of the package. In order to achieve the best possible protection of the information medium in such a package it is provided that an elevation rises from the body which is disposed centrally in the receiving space, which elevation is used as abutment for the central zone of the information medium and an elevation rises from the body which is coaxial to said elevation and is used as abutment for the outer edge zone of the information medium to be received.

20 Claims, 17 Drawing Sheets

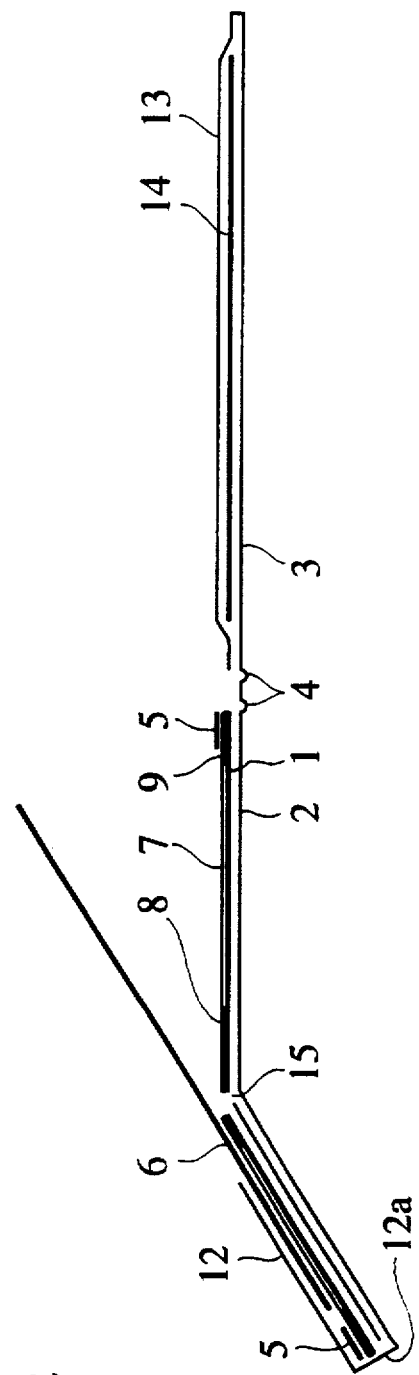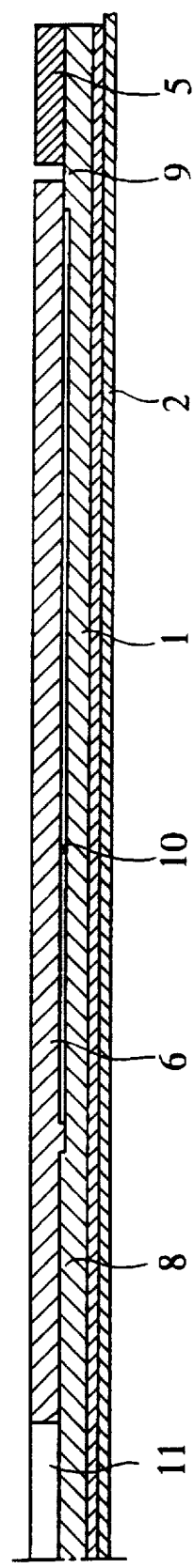

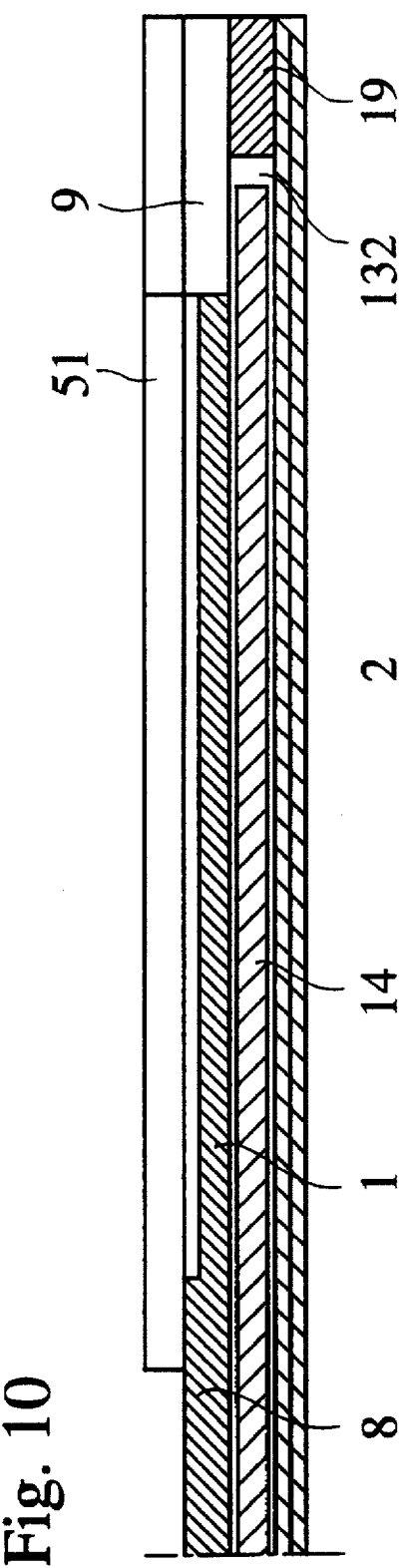
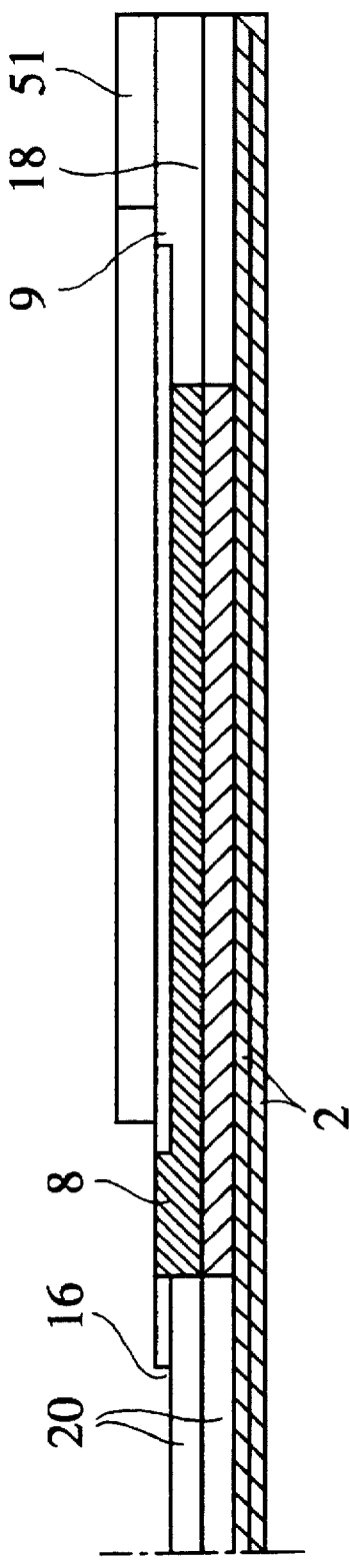

PACKAGE FOR DISC

This application is a continuation of application Ser. No. 08/408,579, filed Mar. 22, 1995.

BACKGROUND OF THE INVENTION

The invention relates to a package pursuant to a package for a disc-like information medium, e.g. a compact disc, which package is made substantially from paper or cardboard and is provided with a body and a cover for it, with the body being provided with limiting parts which rest thereon and limit a receiving space corresponding to the circumferential line of the information medium to be received or of a case which may optionally be provided, into which the disc-like information medium is insertable and the cover covers the upper sides of the limiting parts in the closed condition of the package.

Information media such as compact discs, for example, are usually stored in containers made of plastic which are of a rather complex construction. The container has a part which is provided with a recess having the shape of the information medium and which is connected to a lid via a hinge. Such a container is provided with a central installation which is formed by several resilient parts which hold the information medium in a resilient manner.

In this known package the information medium is held in the region of its central bore. In this case the resilient parts of the central installation of the container press against the inner wall of the bore in the information medium. In this way the information medium is held slightly above the floor of the container, thus providing a respective protection for the information medium against soiling.

The disadvantage of such a package is the high amount of effort and expense required for producing such a package. Moreover, aspects concerning the disposal of plastic packages also have to be taken into account.

A package of the kind mentioned above has also already become known. In this package the cover is formed by a box in which the body with the information medium lying thereon can be inserted. The box is provided with a respectively small opening.

In this known package, which is made of paper or cardboard, the information medium lies with its entire surface on the body. This leads to the disadvantage, however, that dust particles on the body might damage the information medium.

OBJECTS AND SUMMARY OF THE INVENTION

It is the object of the present invention to avoid such a disadvantage and to provide a package of the kind mentioned above which is easy to produce and ensures the best possible protection of the information medium.

In accordance with the invention this is achieved in that an elevation rises from the body which is disposed centrally in the receiving space, which elevation is used as abutment for the central zone of the information medium and an elevation rises from the body which is coaxial to said elevation and is used as abutment for the outer edge zone of the information medium to be received.

The proposed measures ensure that the region of the information medium in which the information is recorded is held in a small distance above the body. Here the information medium is supported only in a narrow ring region which encloses the bore of the information medium and in a narrow annular outer edge region of the information medium. This ensures extensive protection for the information medium.

In accordance with a further feature of the invention a part of the receiving space is covered with an overlap which defines a receiving means for the information medium between the overlap and the floor of the receiving space.

This leads to the advantage of a very secure retainment of the information medium. Thus the proposed measure ensures that an information medium cannot fall out during the opening of a package.

According to a further feature of the invention, the overlap rests on the adjacent limiting parts, which are preferably made from corrugated cardboard. Therefore, the information medium cannot be in contact with the cover in the closed condition of the package. In this manner, an enhanced protection of the information medium is achieved.

In case the body is provided with a hinge formed by a linear weakening in the material in the form of an embossing or a scratched cut, for example, which hinge extends through the receiving space, preferably through the central elevation, an information medium can be easily inserted into and removed from a body by folding a part thereof. When the hinge of the body extends through the central elevation of the body, then this leads to the advantage that even when the body is folded, the information medium rests on a narrow ring region enclosing its bore and on its narrow annular outer edge region, thus ensuring extensive protection of the information medium. In addition, the information medium can be grasped in its central region which is usually free from any recorded information.

According to a further feature, the body is provided at least two mutually opposed lateral edges with open-sided recesses which extend into the receiving space, with the body being held on a lower part covering said recesses.

The features allow grasping an information medium inserted in the body at its outer shell surface and removing it from or inserting it into the body.

In this regard the lower part with the cover can be connected in one part with a hinge zone formed by two narrow zones extending mutually parallel and having a reduced resistance moment.

These features lead to the advantage of a very simple production of such a package.

According a further feature of the invention, the body is provided with a bore which is arranged in the zone of the central elevation to facilitate the grasping of an information medium which is provided with a central bore and is inserted into the package, whereby it is sufficient that this bore is arranged in the uppermost layer of a multi-layered body. This bore may principally also extend through all layers of the body.

To provide the possibility of accommodating in a simple manner a playbill, for example, in the package it is advantageous if a pocket is arranged on the inner side of the cover or the body limits a pocket jointly with the lower part.

To provide security against exchanging the information medium from an original package it is advatageous if a removable protective cover is provided which extends over an information medium placed in the receiving space and is connected along its edges substantially continuously with the body and/or the limiting parts or the overlap, with the protective cover being made from an easily tearable paper or a transparent plastic foil or the removable protective cover is substantially connected to the overlap in a plane manner and can be torn off along its edge disposed in the region of the receiving space.

Moreover, as a result of the proposed protective cover there is optimal protection of the information medium against soiling.

BRIEF DESCRIPTION OF THE DRAWINGS

The invention is now explained in closer detail by reference to the enclosed drawings, wherein:

FIG. 2 schematically shows a section along the line II—II in FIG. 1;

FIG. 3 shows a section through a detail of the package in accordance with FIG. 1;

FIG. 10 shows a detailed section through the package in accordance with FIG. 8;

FIG. 15 shows a detailed section of the package in accordance with FIG. 13;

DESCRIPTION OF PREFERRED EMBODIMENTS

Figure 1:
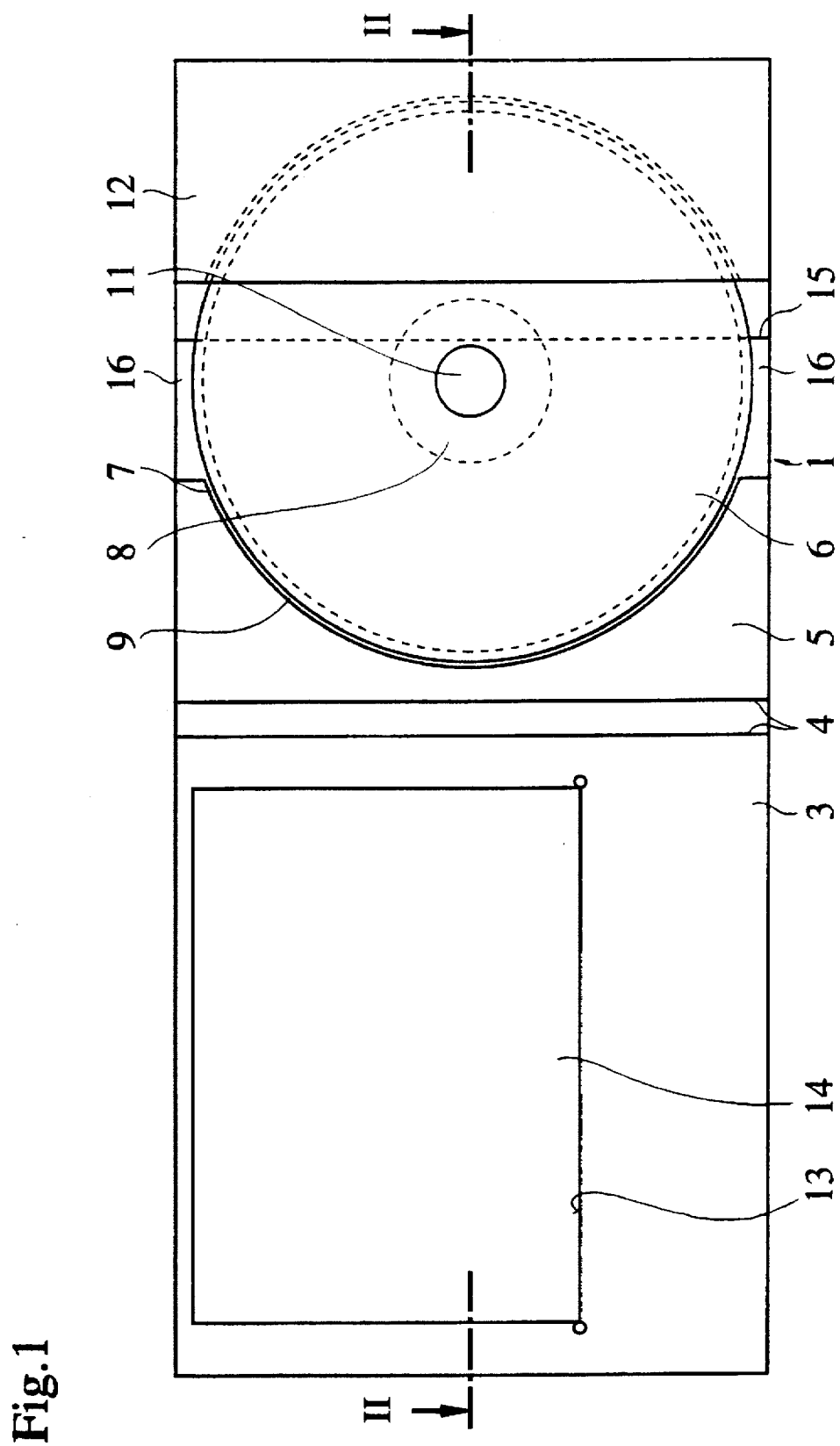
FIG. 1 shows in a top view a first embodiment of a package in accordance with the invention for an information medium in the opened condition.

The package in accordance with FIGS. 1 to 3 is provided with a body 1 which, as is shown in FIG. 3, is attached to a double-ply lower part 2. This lower part 2 is connected to a cover 3, with both elements being made from one part. The lower part 2 is connected to the cover 3 via two narrow zones 4 extending mutually parallel and having a reduced moment of resistance, with both zones 4 forming a hinge so that the cover can be folded over the body 1.

The two zones 4 are formed in the embodiment shown therein by embossings whose mutual distance correspond approximately to the overall height of the body 1 plus that of the lower part 2 and that of the limiting parts 5 attached to body 1.

The limiting parts 5 limit a receiving space 7 corresponding to the circumferential line of the information medium 6 to be received.

Body 1 is provided with a central elevation 8 and an elevation 9 coaxially encompassing elevation 8, with both preferably being produced during the pressing of the body. The limiting parts 5 rest on the elevation 9 coaxially encompassing the central elevation 8.

The limiting parts 5 and the body 1 may be made from the same material. It is also possible that they are made from one part, e.g. by respective embossing.

The limiting parts 5 are provided with a height exceeding the thickness of the information medium 6 to be received. This ensures that the cover 3 does not rest on the information medium 6, but on the limiting parts 5. The two elevations 8, 9 of the body 1 ensure furthermore that the information medium 6 rests freely in its zone containing the recordings and is kept distanced from the floor 10 of body 1.

The information medium 6, which is provided with a bore 11, lies with an edge zone encompassing bore 11 on the central elevation 8 and in its outer edge zone on elevation 9 of body 1.

The package is further provided with an overlap 12 which partly covers the receiving space 7 and thus limits it upwardly. The information medium 6 can be inserted in this space limited by body 1, the limiting parts 5 and the overlap 12. The overlap 12 is provided with a bend-off 12a which extends towards the lower part 2.

Furthermore, the cover 3 also rests on overlap 12, thus leading in the closed condition of the package to a respective gap between cover 3 and information medium 6.

In this respect it is also possible to arrange the cover 3 shorter than would be necessary for the complete coverage of body 1. In this case the cover 3 rests on overlap 12 in the closed condition.

The overlap 12 with the bend-off 12a may be made from the same material as the lower part 2. It is also possible to provide an arrangement of the lower part 2 with the overlap 12 which is made from one part.

The lower part 2 may be arranged as a single layer or also in several layers.

It is principally also possible to make the body 1 and the lower part 2 from the same material. An arrangement which is made from one part is also possible.

In the embodiment in accordance with FIGS. 1 to 3 a pocket 13 is formed the inner side of cover 3. It can be used to insert a playbill 14, for example.

As is shown particularly well in FIG. 2, body 1 is provided with a hinge 15 which is formed by a linear weakening in the material and allows the folding of body 1. The weakening may be formed by a scratched cut which extends either over the entire body or only up to a specific depth thereof or by embossing. This hinge extends between two mutually opposed edges of body i and through the central elevation 8 of the body. In this way, when body 1 is folded, the information medium 6, as is shown in FIG. 2, can be inserted in the narrow ring region which encompasses the bore of information medium 6 and can be supported on the narrow annular outer edge zone of the information medium 6 on the central elevation 8 and elevation 9, so that the zone provided with recordings of said information medium 6 is not in contact with the floor 10 of body 1. Furthermore, information medium 6 can be grasped in the zone of its bore 11 during the retraction from the package, so that the zone carrying the recorded information of information medium 6 need not be touched with the fingers.

A gap 16 remains between the two limiting parts 5 which enables the grasping of the information medium 6 at its outer shell surface.

Figure 4:
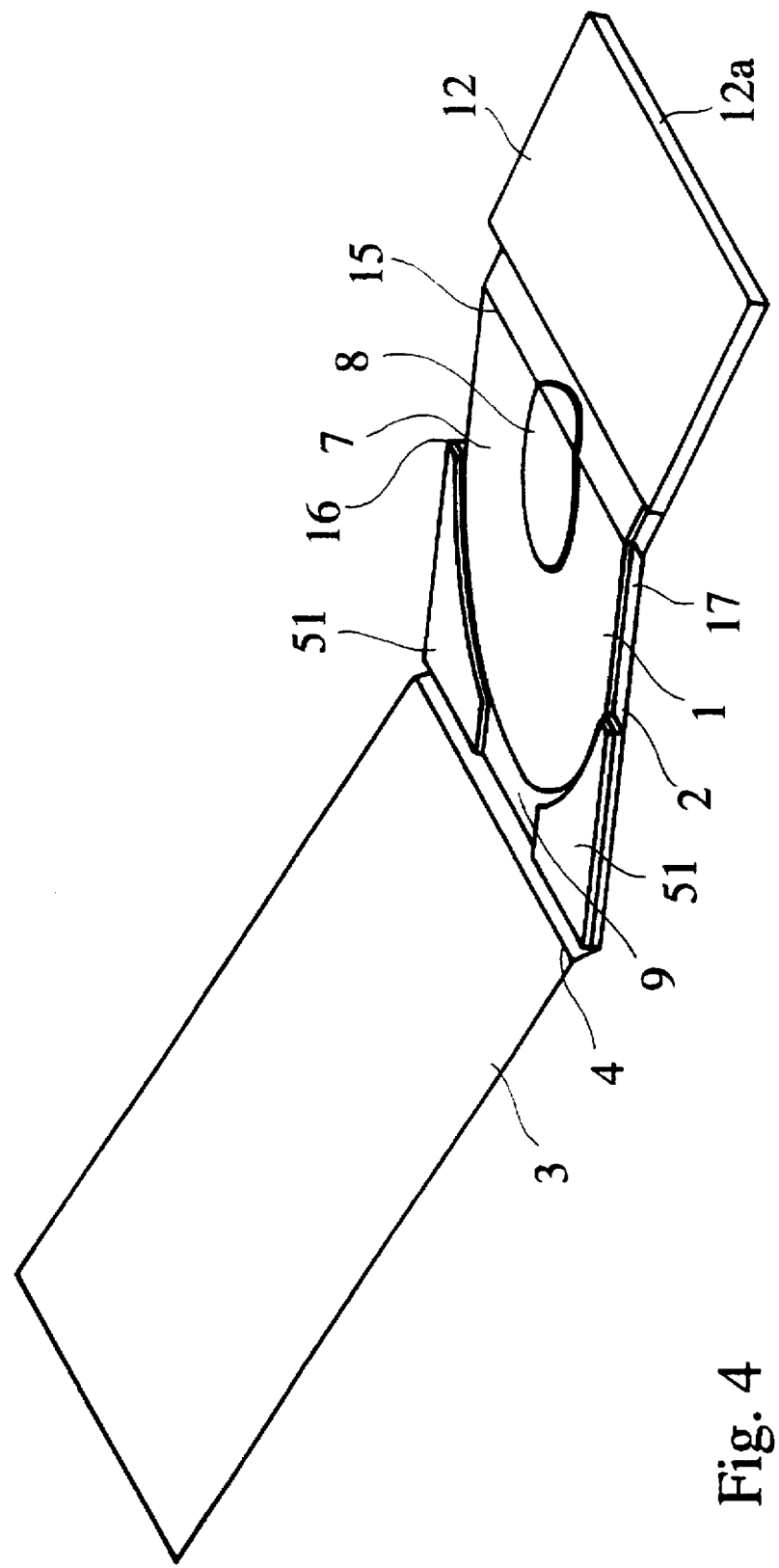
FIG. 4 shows an axonometric representation in the folded condition of a package similar to the one in FIG. 1.
Figure 5:
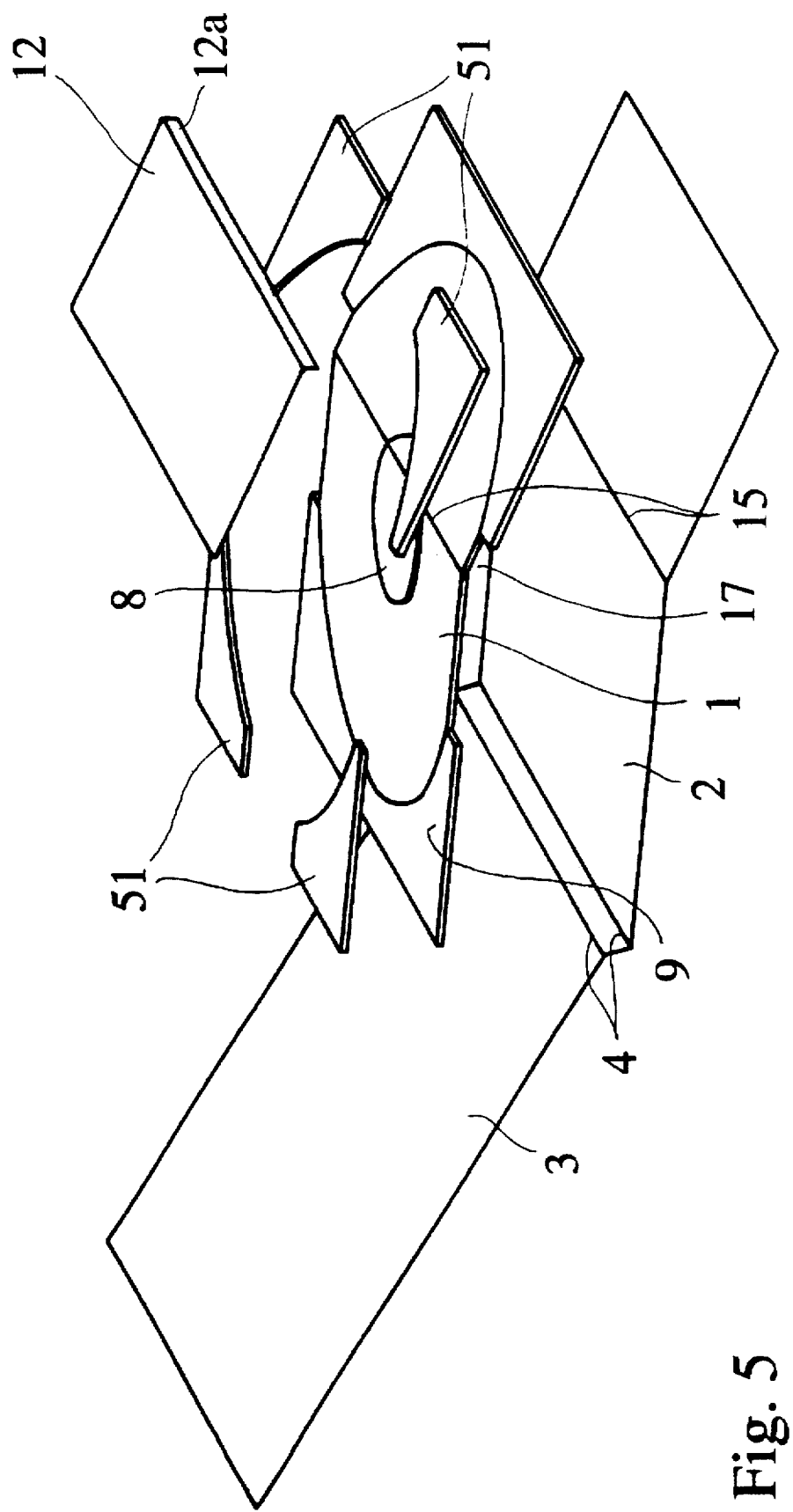
FIG. 5 shows an exploded view of the package in accordance with FIG. 4.

The embodiment in accordance with FIGS. 4 and 5 is distinguished from that of FIGS. 1 to 3 in that four limiting parts 51 which limit the receiving space 7 are provided instead of the two limiting parts 5. Moreover, the body 1 is provided with open-sided recesses 17 at two opposite sides. In this region a gap 16 is also provided between the limiting parts 51. The recesses 17 extend into a region which is covered when the information medium 6 is inserted.

It is also possible that the overlap 12 extends below the limiting parts 51 with a region adjoining the bend-off 12a.

In the embodiment in accordance with FIGS. 4 and 5 the body 1 is also provided with a central elevation 8 and an elevation 9 encompassing it coaxially, which are both used for supporting an information medium 6.

Furthermore, a pocket 13 in cover 3 has been omitted in the embodiment in accordance with FIGS. 4 and 5. If necessary, a playbill can be attached to the inner side of cover 3.

Figure 6:
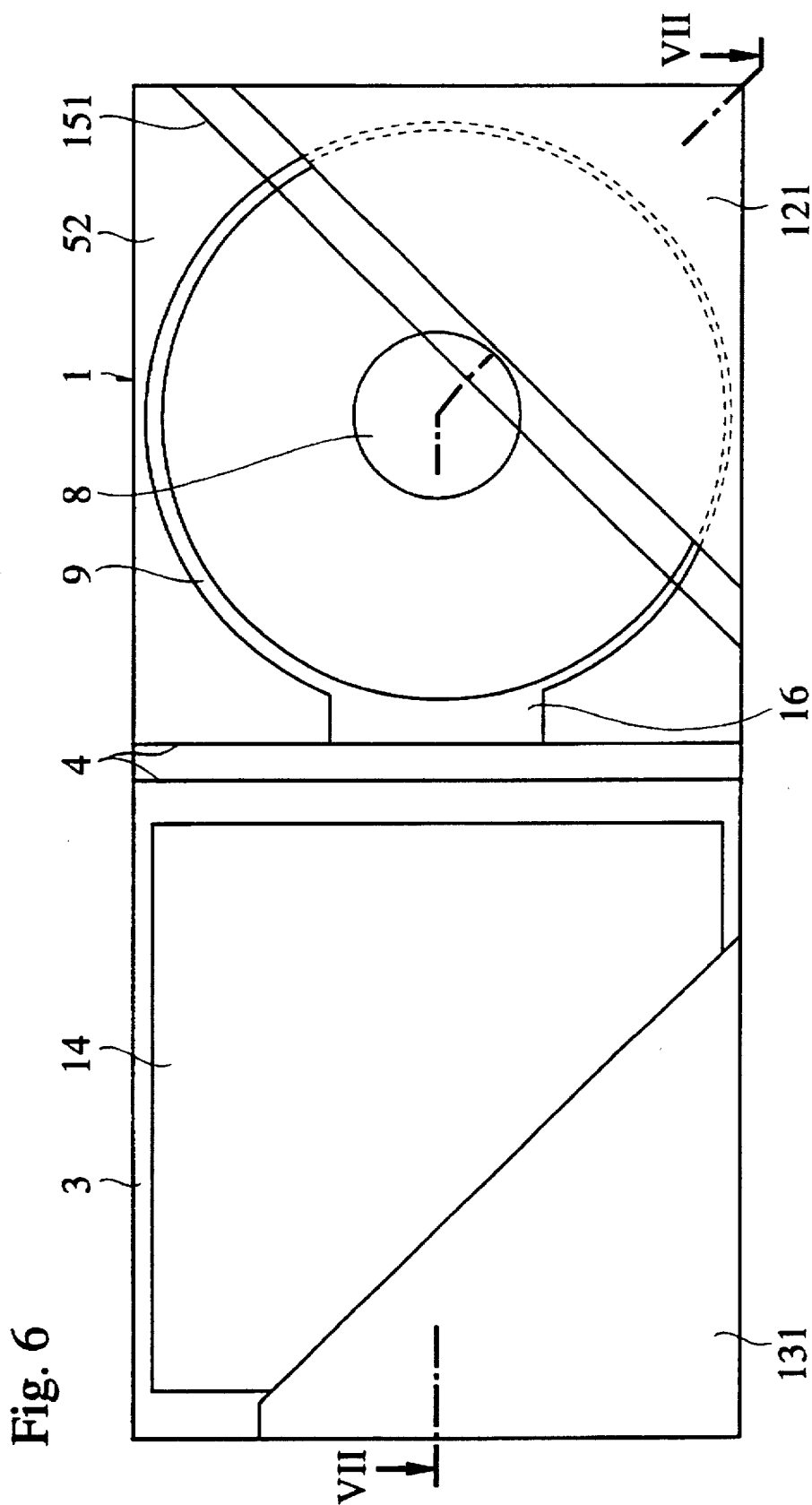
FIG. 6 shows a further embodiment of a package in accordance with the invention.
Figure 7:
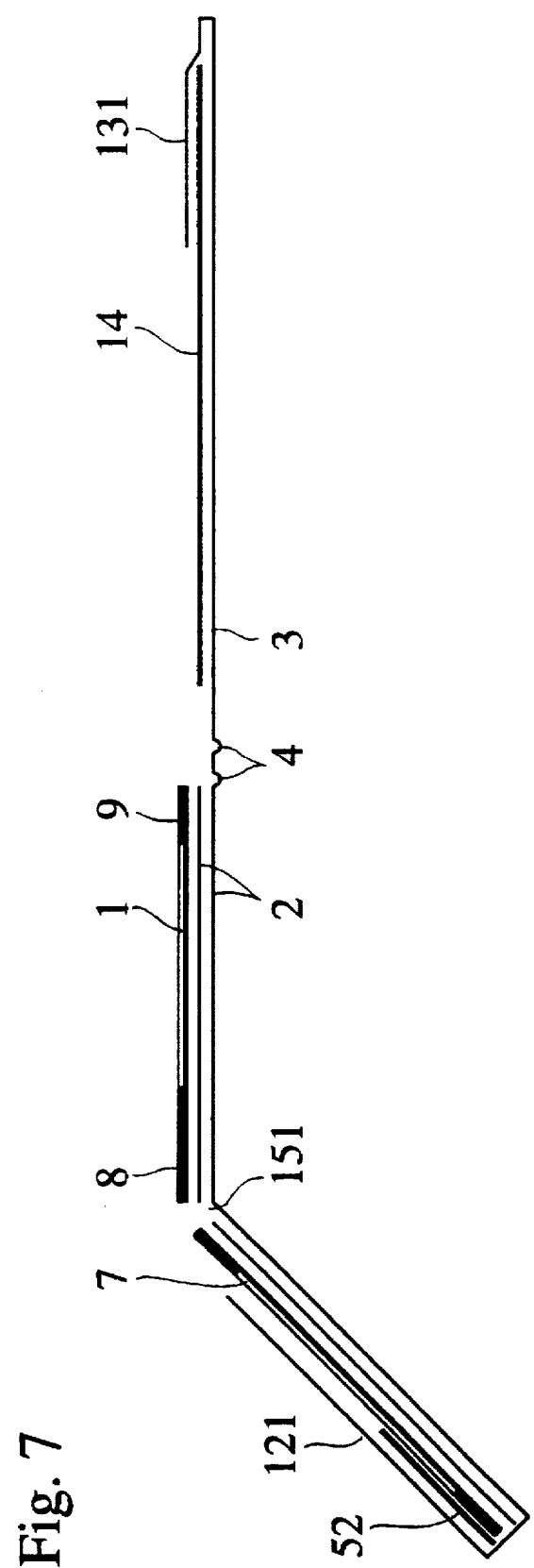
FIG. 7 shows a section through the package in accordance with FIG. 6 in the folded condition.

In the embodiment in accordance with FIGS. 6 and 7 a hinge 151 extends in an inclined manner over body 1. Said hinge 151 also extends through the elevation 8. Furthermore, a pocket 131 is attached to the inner side of cover 3. A playbill can be inserted in this pocket. The pocket itself can be made from the same material as cover 3 and can be made from one part with it.

In the embodiment in accordance with FIGS. 6 and 7 only one limiting body 52 is provided which extends nearly over the entire circumference of the information medium 6 to be received. The limiting body 52 only leaves open a gap 16, which facilitates a grasping at the outer edges of an information medium 6 which is disposed in the package. The hinge 151 also extends over the limiting body 52.

Furthermore, a triangular cover 121 is over a part of extends over a part of the receiving space 7.

Figure 9:
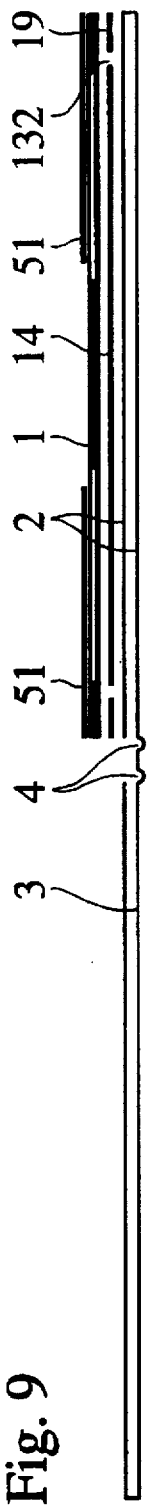
FIG. 9 shows a section along the line IX—IX in FIG. 8.
Figure 8:
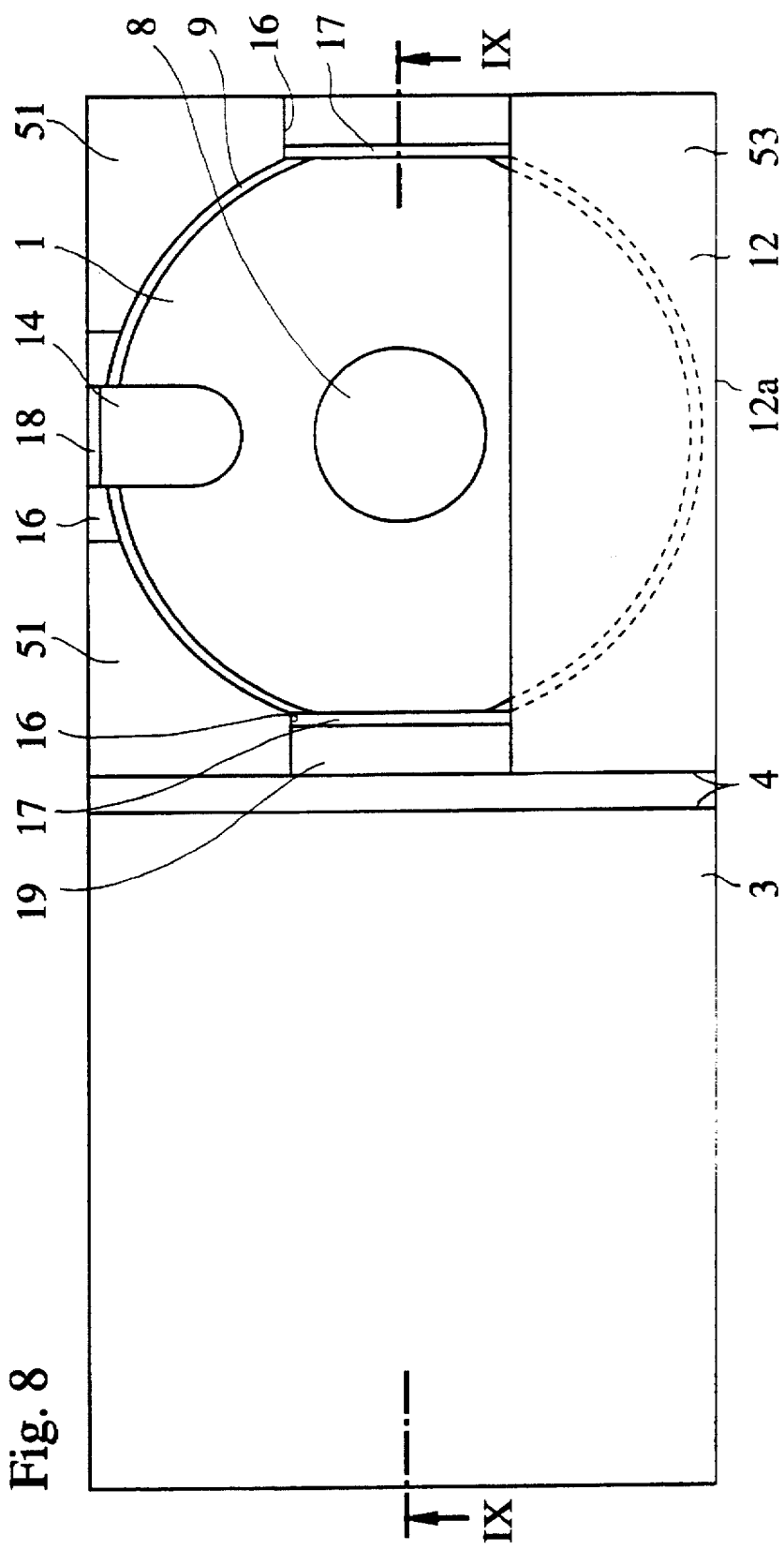
FIG. 8 shows a further embodiment of a package in accordance with the invention.

In the embodiment in accordance with FIGS. 8 to 10 the body 1 is provided with open-sided recesses 17 at mutually opposite sides and a further open-sided recess 18. Said recesses 17, 18 allow the easy grasping of an information medium 6 during the insertion in the package or during the removal thereof from the package. The recesses 17, 18 extend into a region of the receiving space 7 which is covered by the information medium 6 when it is inserted.

Three limiting parts 51 and 53 are provided in this embodiment, whereby the limiting body 53 is covered by an overlap 12.

Gaps 16 remain between the limiting parts 51, 53 in the regions of the recesses 17, 18.

As is shown in FIGS. 9 and 10, the cover 3 and the lower part 2 are arranged in two layers. The representation of elevations 8 and 9 of body 1 was omitted in FIG. 9 for the purpose of better clarity. The body 1 is not directly glued to the lower part 2, but intermediate strips 19 are provided which are glued on the one side to lower part 2 and on which the body 1 is glued to.

A pocket 132 is formed in this way by the intermediate strips 19, the lower part 2 and the body 1, into which a playbill 14, for example, can be inserted. The opening of this pocket is situated at the edge of the body 1 or lower part 2 which extends parallel to the overlap 12. The overlap provided with a bend-off 12a encloses said pocket 132.

Figure 11:
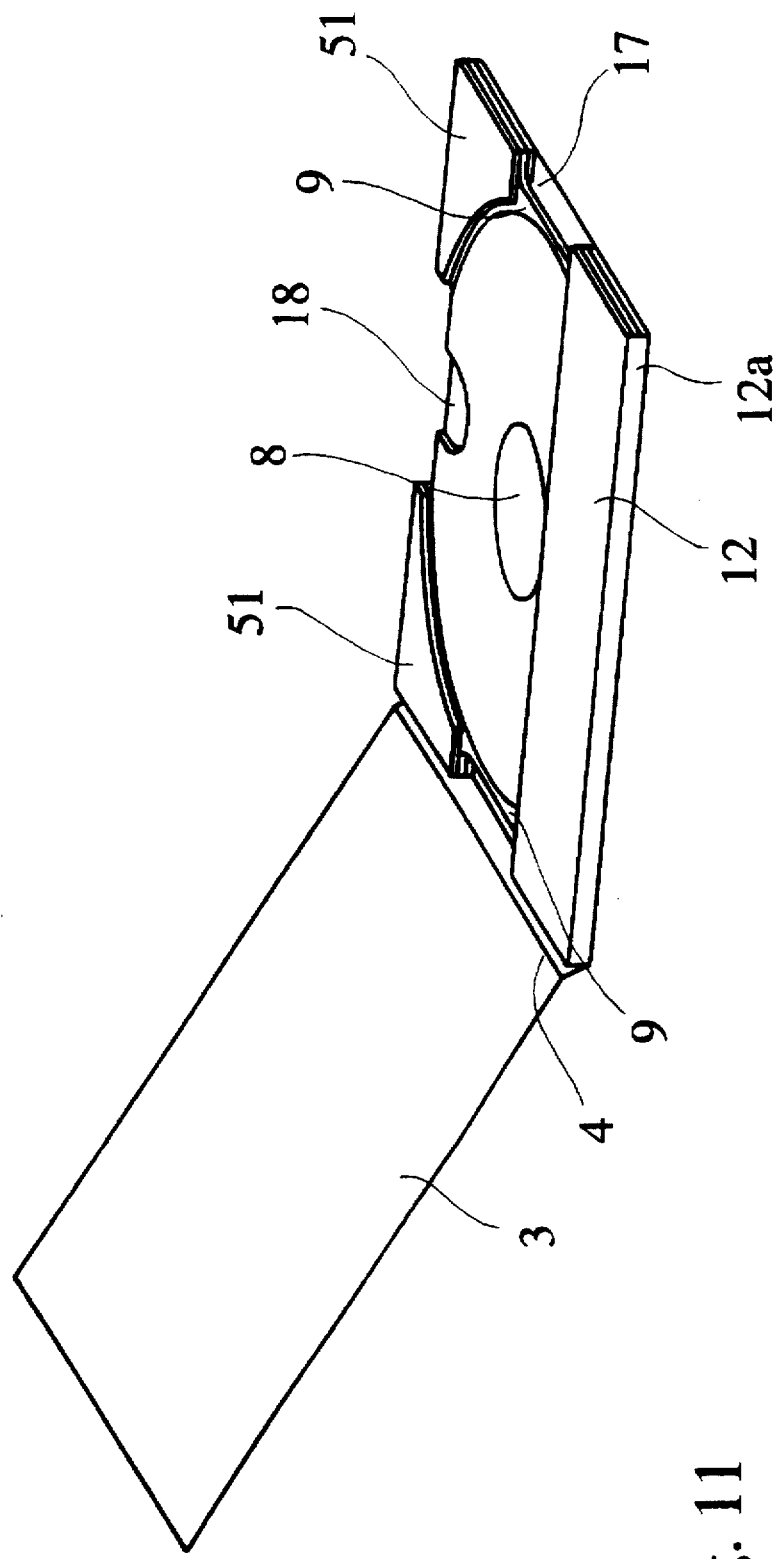
FIG. 11 comprises an axonometric view of a package in accordance with the invention which is similar to that of FIG. 8.
Figure 12:
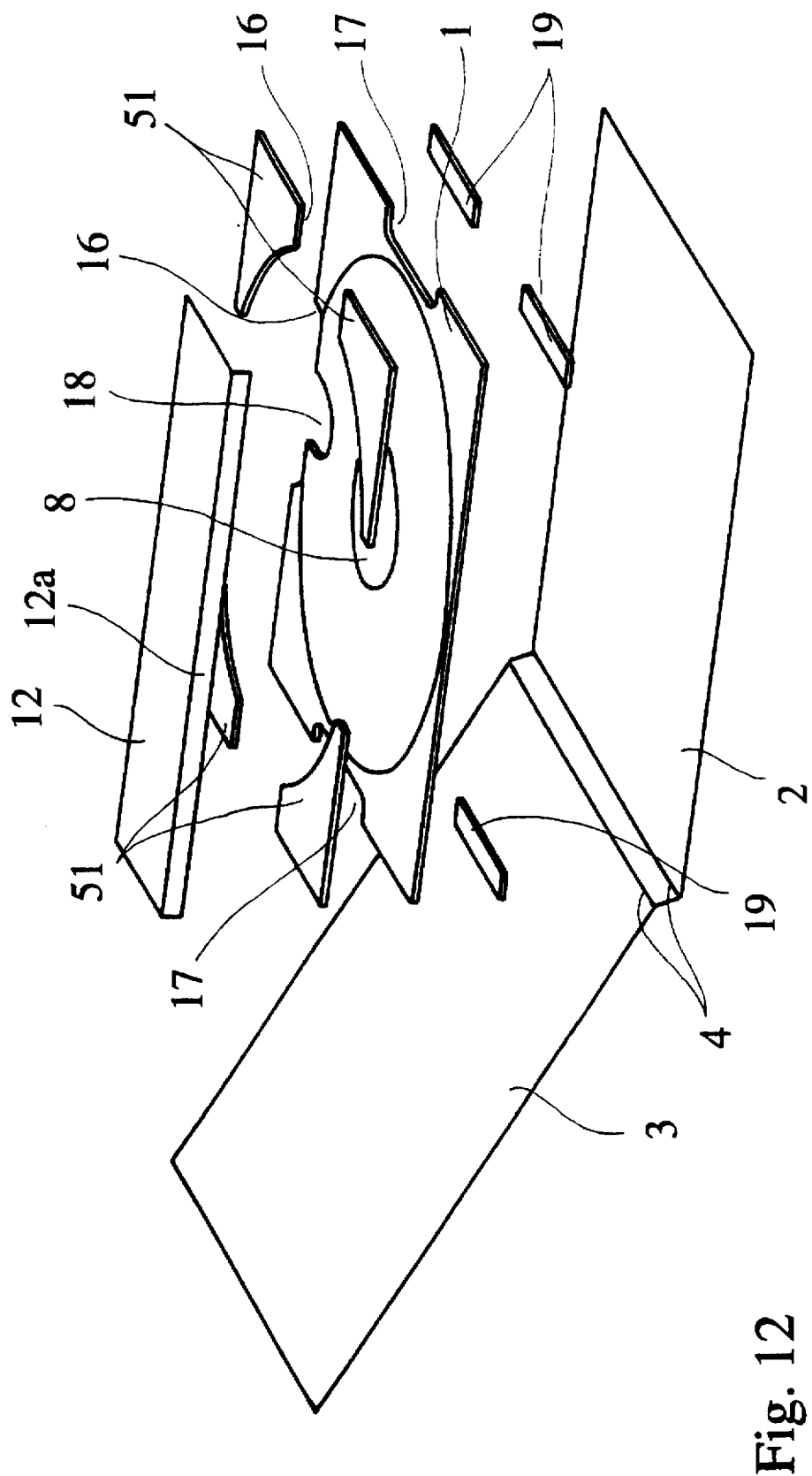
FIG. 12 shows an exploded view of a package in accordance with FIG. 11.

The embodiment in accordance with FIGS. 11 and 12 is distinguished from the one in accordance with FIGS. 8 to 10 only in that four limiting bodies 51 are provided. Intermediate strips 19 are provided in this embodiment too, which are subdivided into two parts and are separated from one another by the length of recesses 17, 18.

In the packages in accordance with FIGS. 8 to 10 and 11 and 12, respectively, the recesses 17, 18 of the body 1 are covered by the lower part 2 and, when cover 3 is closed, by it too. This is shown in particular in FIG. 11.

Figure 14:
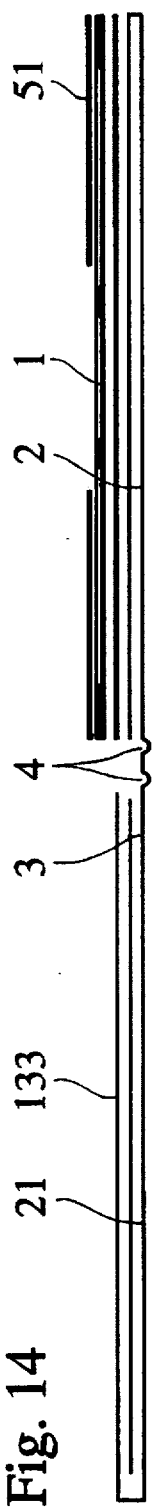
FIG. 14 shows a section along line XIV—XIV in FIG. 13.
Figure 13:
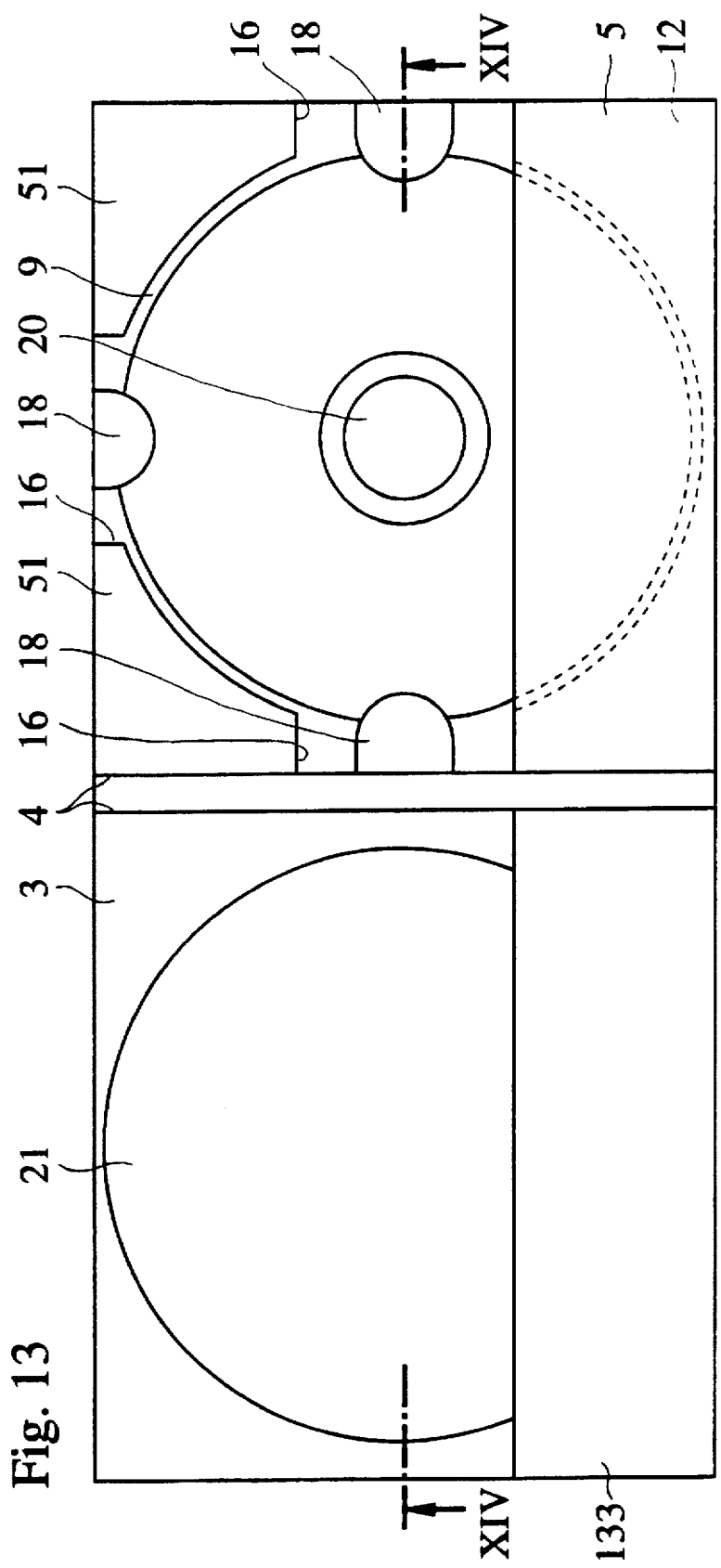
FIG. 13 shows a further embodiment of a package in accordance with the invention.

In the embodiment in accordance with FIGS. 13 to 15 the body 1 is arranged in two layers and is provided with a central bore 20. It is sufficient that said bore 20 is provided in the uppermost layer of body 1. Bore 20 may also extend through the entire body 1. Furthermore, open-sided recesses 18 are provided in body 1 which—as in all other embodiments—is provided with a central elevation 8 and an elevation 9 which encloses elevation 8 coaxially.

Cover 3 is provided with a inspection window 21 which is formed by a transparent plastic foil or the like. This foil is glued to the inner side of the cover and overlaps a respective breakthrough in cover 3. Furthermore, cover 3 is provided with a pocket 133 into which a playbill, for example, can be inserted.

Figure 16:
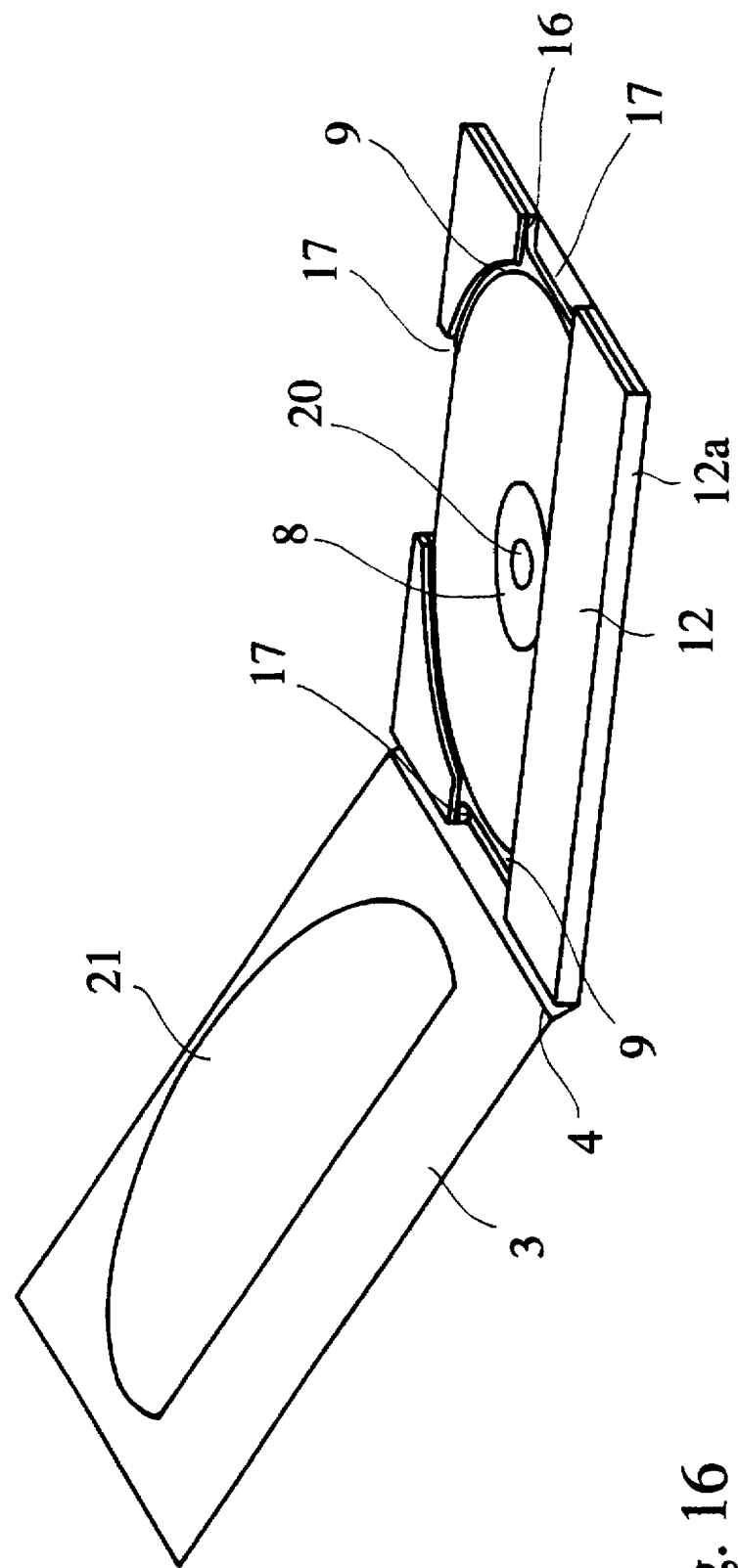
FIG. 16 shows an axonometric representation of a package in accordance with the invention similar to that of FIG. 13.
Figure 17:
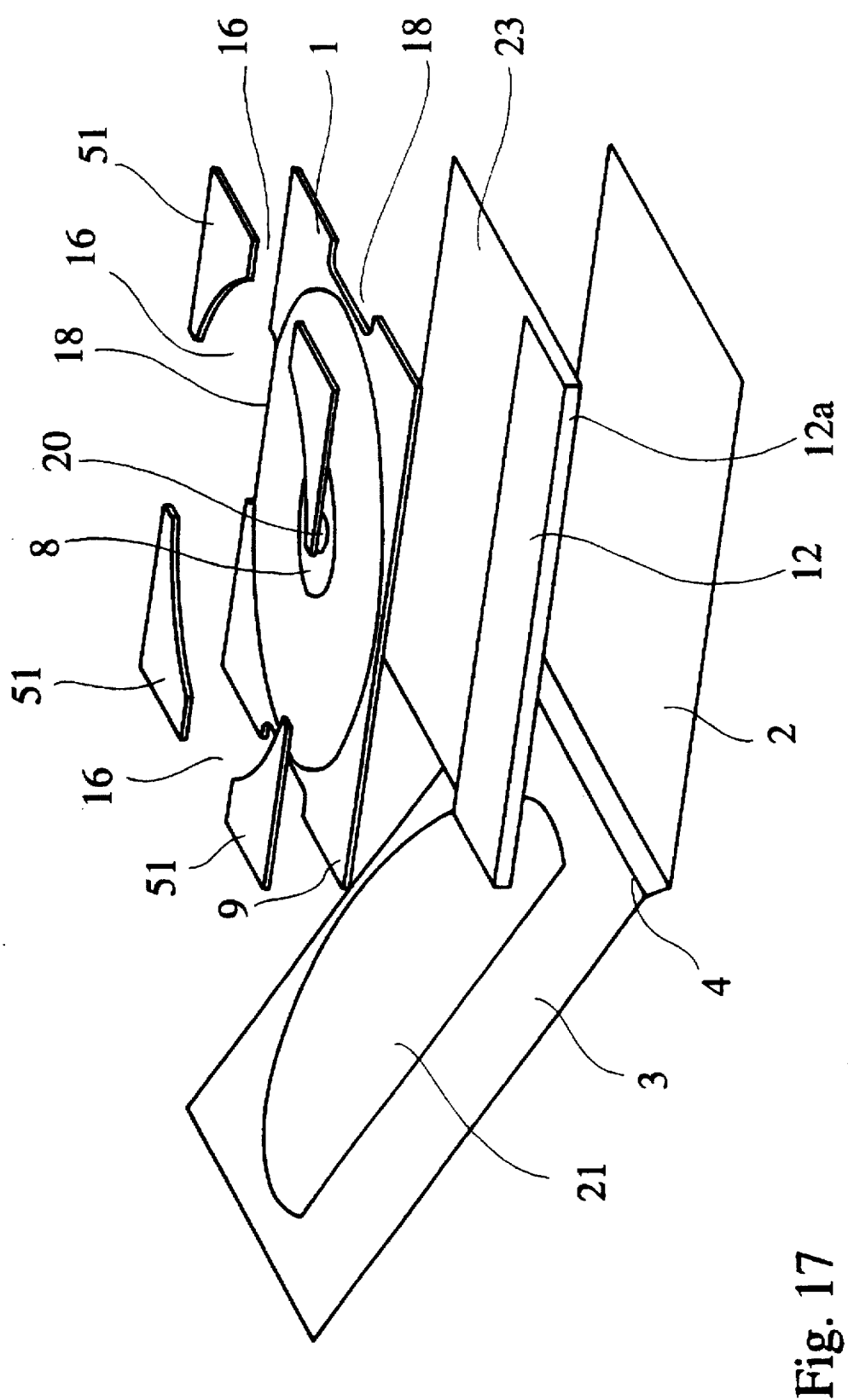
FIG. 17 shows an exploded view of the package in accordance with FIG. 16.

The embodiment in accordance with FIGS. 16 and 17 is distinguished from the one in accordance with FIG. 13 to 15 in that the pocket 133 is missing and that recesses 17 are provided instead of recesses 18 which have a substantially trapezoid form, whereby four limiting bodies 51 are provided. Furthermore, the lower part 2 is arranged in two parts, with the overlap 12 being connected with the bend-off 12a in one part with a rest 23. The rest 23 is connected to the lower part 2.

Body 1 is glued to rest 23, with the body 1 being provided on three sides with open-sided recesses 18.

Figure 18:
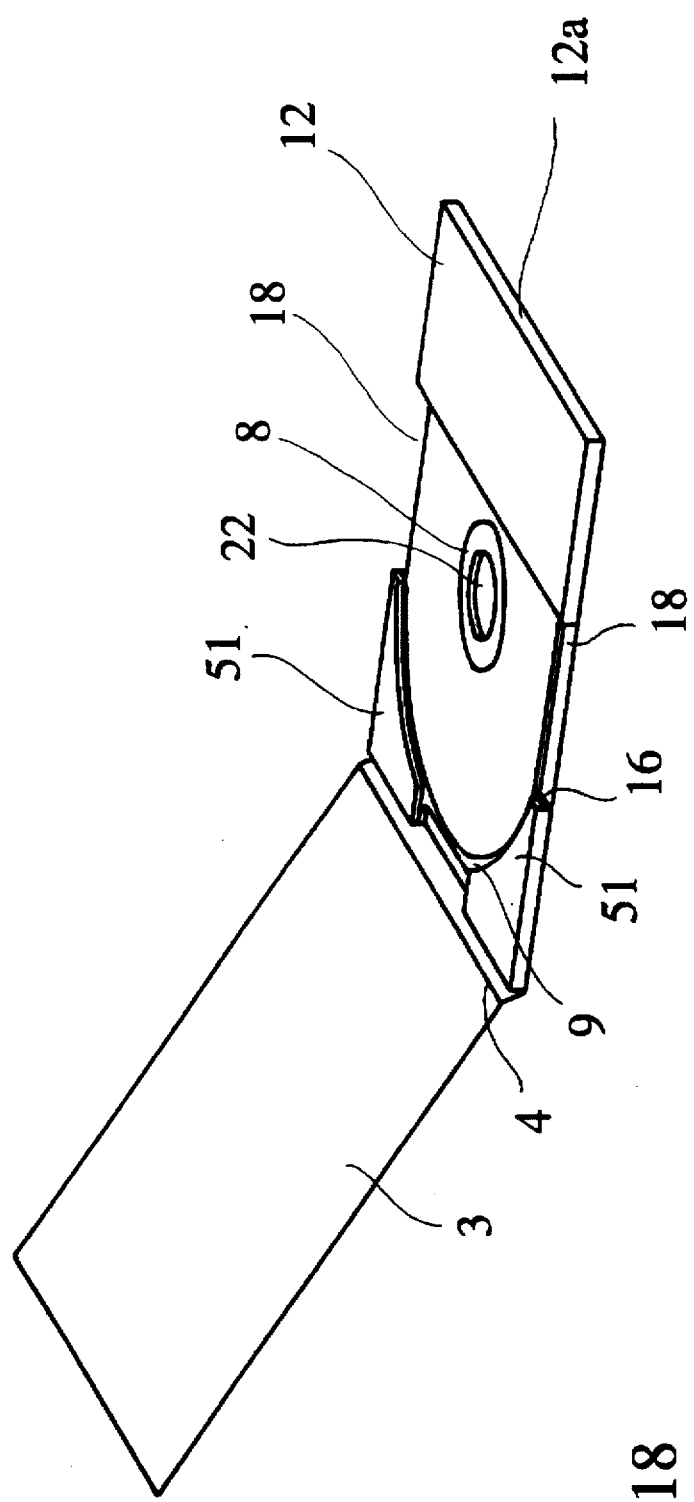
FIG. 18 shows an axonometric representation of a further embodiment of a package in accordance with the invention.

In the embodiment in accordance with FIG. 18 the overlap 12 extends parallel to the zones 4 which form a hinge, similar to the embodiment in accordance with FIGS. 1 to 3.

Open-sided recesses 18 are arranged at the three free sides of body 1. Body 1 is provided with a central bore 22.

Figure 19:
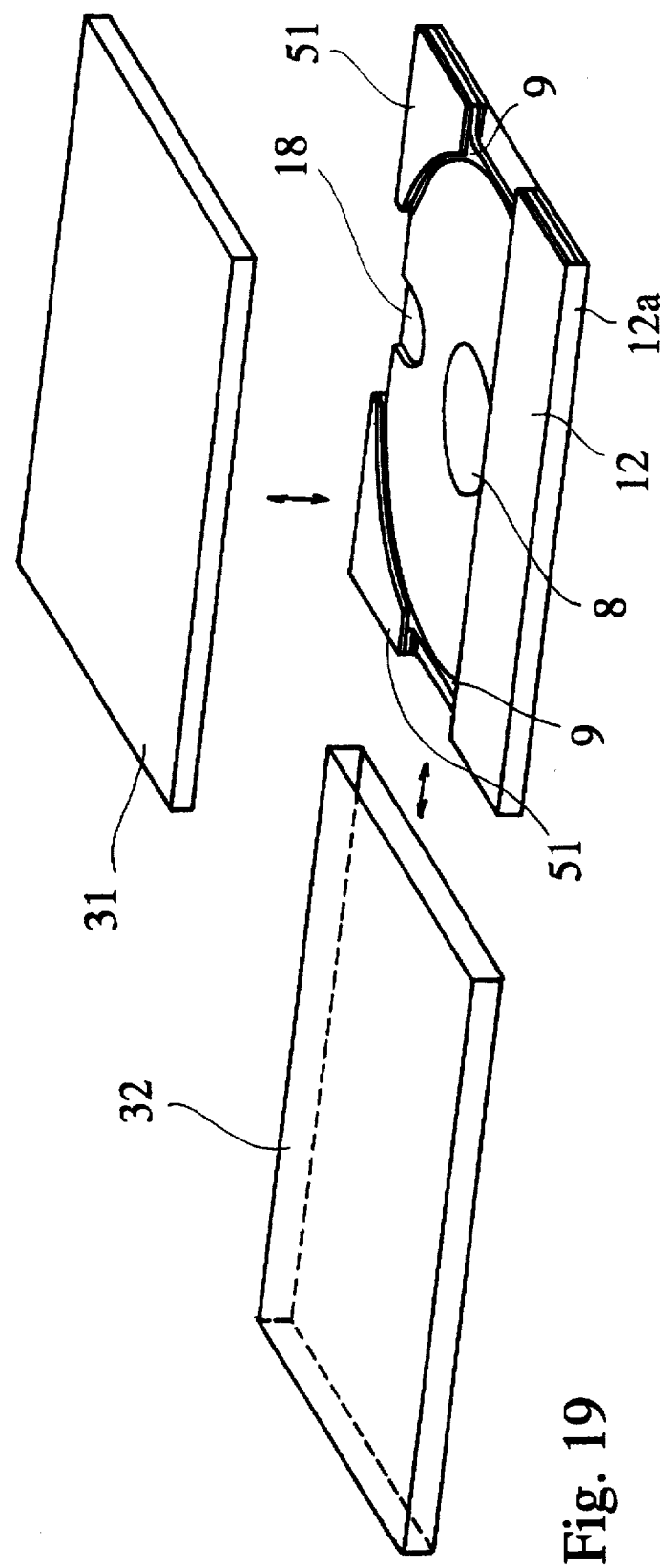
FIG. 19 shows a further embodiment of the package with a loose cover.

FIG. 19 shows a further embodiment of a package in accordance with the invention, in which a loose cover 31 is provided which overlaps the body 1 plus limiting parts 51 and an overlap 12 in the manner of a box lid. Cover 31 is provided with a circumferential folded edge which encloses the side walls of the body 1 and the limiting parts 51 in the closed condition.

Instead of the cover 31 arranged as a lid it is also possible, as is shown in FIG. 19, to provide a cover 32 in the form of a loose cover, into which a body 1 plus limiting parts 51 and an overlap 12 can be inserted. The cover 32 is only open on one narrow side.

Figure 20:
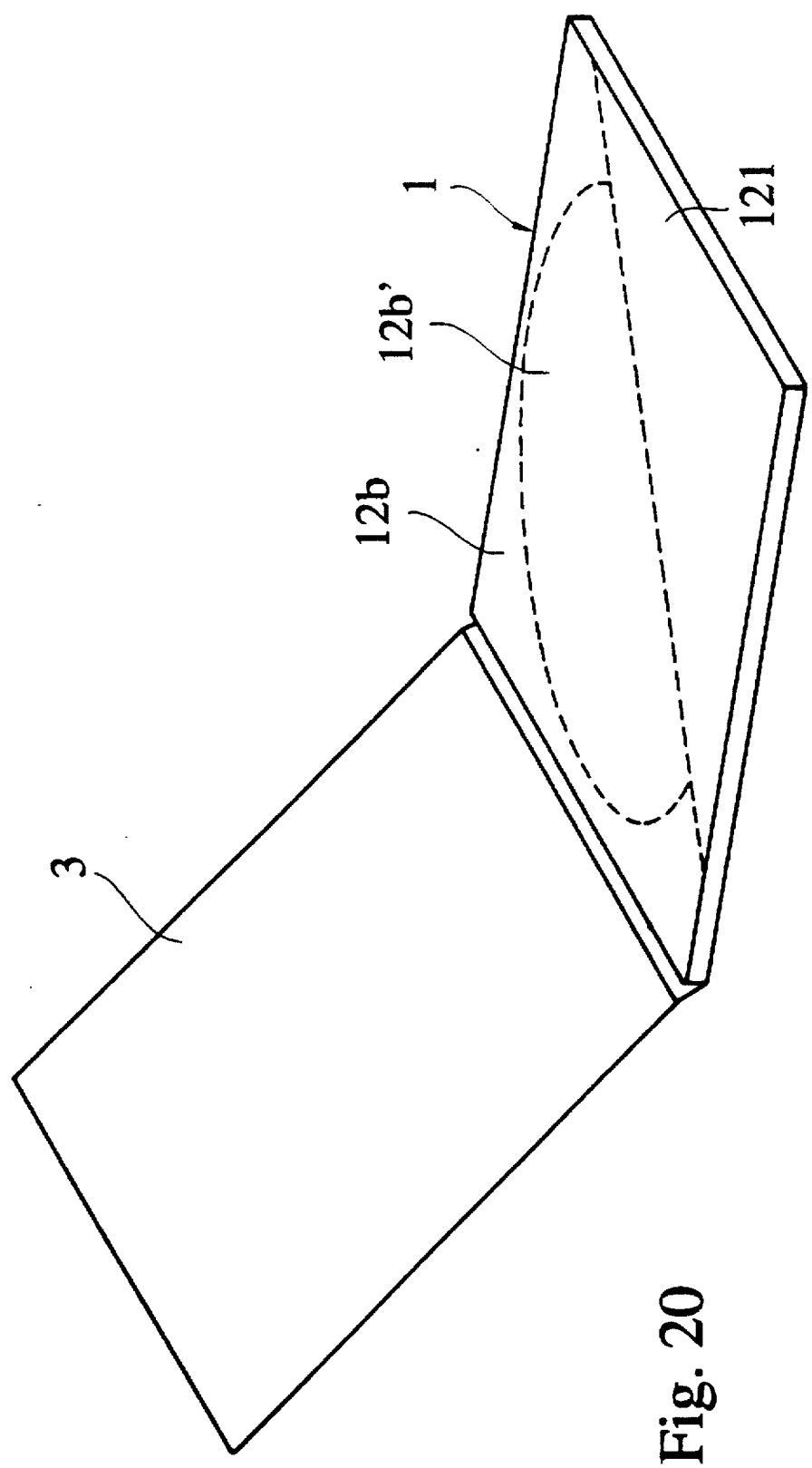
FIG. 20 shows a package in accordance with the invention with a protective cover for an inserted information medium and FIG. 21 shows the package in accordance with the invention after removal of the protective cover.

FIG. 20 shows a package in accordance with the invention with the inserted information medium which is covered by a protective cover 12b which is connected along its edges substantially continuously with the limiting parts 52 and the cover 121. In this way the information medium is protected from direct access and against dirt particles.

Figure 21:
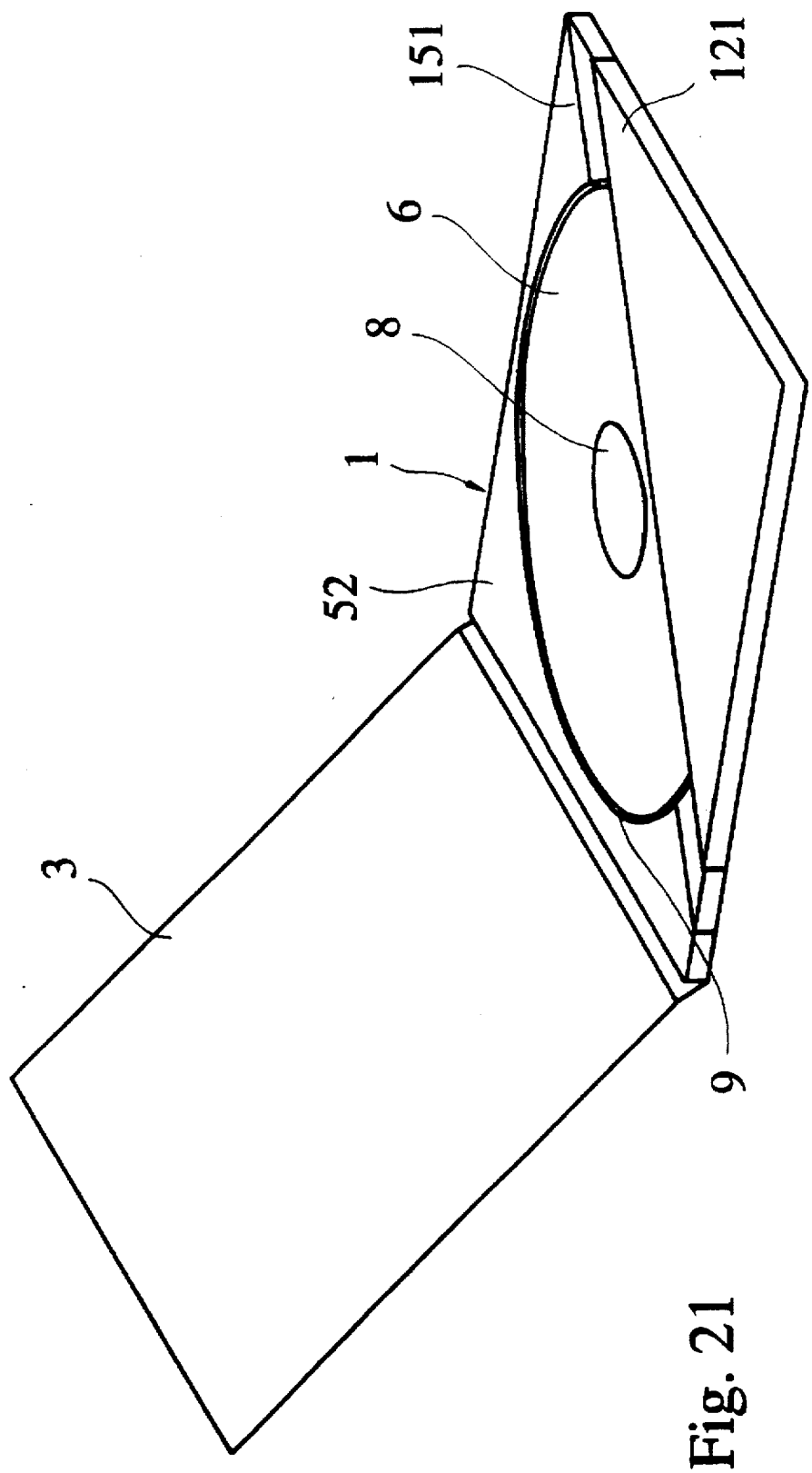

Any removal of the information medium can only be made after the destruction or removal of the protective cover 12b. FIG. 21 shows the package with inserted information medium 6 after the removal of the protective cover 12b. It is sufficient when the protective cover 12b (FIG. 20) is connected along a circumferential narrow edge strip with the body 1 or with the limiting bodies 51 and the overlap 121. It is also possible that the protective cover 12b is also connected substantially over its entire surface with the overlap 121. In the latter case the protective cover 12b or its one part 12b' can be separated along the edge of overlap 121 extending in the region of receiving space 7.

It is principally also possible to provide a package in accordance with the invention with several bodies 1 which are mutually distanced to the extent that information media can be inserted between them.

Furthermore it is also possible to combine features of various embodiments with one another.

I claim:

1. A package for a disc-like information medium made of paper and of a defined thickness having a body and a cover for covering the body, with the body including limiting parts which define a receiving space for receiving the information medium therein and which thereby corresponds to the circumferential boundary of a peripheral edge of the information medium with said limiting parts having a height exceeding the defined thickness of the information medium received in the package and wherein the cover covers the upper sides of the limiting parts in the closed condition of the package, said package comprising a central hub extending from the body which is disposed centrally in the receiving space for receiving a central bore of the information media to support the information media within the package, a raised confirming member extending from the body which is coaxial to said central hub for protective confinement of the peripheral edge of the information medium, and an overlap covering a portion of said receiving space and resting on adjacent limiting parts which thereby defines a receptacle for the information medium and provides a rest surface for said cover when the package is in its closed condition and a protective space between said cover and said information medium.

2. A package as claimed in claim 1, wherein said receptacle is defined between the overlap and the floor of the receiving space.

3. A package as claimed in claim 1, wherein the body includes a hinge formed by a linear weakening in the body which extends through the receiving space.

4. A package as claimed in claim 3, wherein said hinge is formed by a linear weakening in the body by means of embossing.

5. A package as claimed in claim 3, wherein said hinge is formed by a linear weakening in the body by means of a scratched cut.

6. A package as claimed in claim 3, wherein said hinge extends through the central hub.

7. A package as claimed in claim 1, wherein the body includes at least two opposed lateral edges with open-sided recesses which extend into the receiving space, with the body being retained on a lower part covering said recesses.

8. A package as claimed in claim 7, wherein the lower part is connected to the cover by a hinge formed by two narrow lines extending parallel to one another and having a reduced resistance moment.

9. A package as claimed in claim 1, wherein the body includes a bore which is arranged in the region of the central hub.

10. A package as claimed in claim 1, wherein a pocket is arranged on the inner side of the cover.

11. A package as claimed in claim 1, wherein the body and the lower part jointly define a pocket.

12. A package as claimed in claim 1, wherein a removable protective cover extends over the information medium positioned in the receiving space.

13. A package as claimed in claim 12, wherein the removable protective cover is substantially connected to the overlap and can be torn off along its edge disposed in the region of the receiving space.

14. A package as claimed in claim 12, wherein said removable protective cover is connected along its edges substantially continuously with the body.

15. A package as claimed in claim 12, wherein said removable protective cover is connected along its edges substantially continuously with the limiting parts.

16. A package as claimed in claim 12, wherein said removable protective cover is connected along its edges substantially continuously with the overlap.

17. A package as claimed in claim 12, wherein said removable protective cover is made from an easily tearable paper.

18. A package as claimed in claim 12, wherein said removable protective cover is made from a transparent plastic foil.

19. A package as claimed in claim 1, wherein said adjacent limiting parts are preferably made from corrugated cardboard.

20. The package as claimed in claim 1 wherein the paper used for the package is relatively thick.

* * * * *